(12) United States Patent
Herrmann et al.

(10) Patent No.: US 6,873,988 B2
(45) Date of Patent: Mar. 29, 2005

(54) SYSTEM AND METHODS PROVIDING ANTI-VIRUS COOPERATIVE ENFORCEMENT

(75) Inventors: Conrad K. Herrmann, Oakland, CA (US); Kaveh Baharestan, San Francisco, CA (US); Joseph E. Bentley, San Jose, CA (US); Jess A. Leroy, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 396 days.

(21) Appl. No.: 10/192,819

(22) Filed: Jul. 9, 2002

(65) Prior Publication Data

US 2003/0055994 A1 Mar. 20, 2003

Related U.S. Application Data

(63) Continuation-in-part of application No. 10/159,820, filed on May 31, 2002, and a continuation-in-part of application No. 09/944,057, filed on Aug. 30, 2001.
(60) Provisional application No. 60/372,907, filed on Apr. 15, 2002, provisional application No. 60/362,525, filed on Mar. 6, 2002, and provisional application No. 60/303,653, filed on Jul. 6, 2001.

(51) Int. Cl.[7] .............................................. G06F 17/30
(52) U.S. Cl. ........................ 707/10; 707/104.1; 713/152
(58) Field of Search ................................ 707/1, 2, 3, 4, 707/5, 6, 7, 8, 10, 9, 100, 104.1, 200; 713/200, 152; 435/5

(56) References Cited

U.S. PATENT DOCUMENTS

| | | | |
|---|---|---|---|
| 5,361,359 A | 11/1994 | Tajalli et al. ................ 713/200 |
| 5,421,006 A | 5/1995 | Jablon et al. ................. 714/36 |
| 5,692,124 A | 11/1997 | Holden et al. ............... 713/201 |
| 5,765,030 A | 6/1998 | Nachenberg et al. ......... 714/33 |
| 5,802,178 A | 9/1998 | Holden et al. ............... 713/151 |
| 5,832,228 A | 11/1998 | Holden et al. ............... 709/225 |
| 5,854,916 A | 12/1998 | Nachenberg .................. 703/21 |
| 5,872,847 A | 2/1999 | Boyle et al. ................. 713/151 |
| 5,999,723 A | 12/1999 | Nachenberg .................. 703/22 |
| 6,067,620 A | 5/2000 | Holden et al. ............... 713/155 |
| 6,105,027 A | 8/2000 | Schneider et al. ............. 707/9 |
| 6,178,505 B1 | 1/2001 | Schneider et al. .......... 713/168 |
| 6,185,678 B1 | 2/2001 | Arbaugh et al. ............... 713/2 |
| 6,205,551 B1 | 3/2001 | Grosse ....................... 713/201 |
| 6,212,636 B1 | 4/2001 | Boyle et al. ................. 713/168 |
| 6,219,786 B1 * | 4/2001 | Cunningham et al. ...... 713/152 |
| 6,272,538 B1 | 8/2001 | Holden et al. ............... 709/223 |
| 6,275,937 B1 | 8/2001 | Hailpern et al. ............. 713/188 |
| 6,408,336 B1 | 6/2002 | Schneider et al. .......... 709/229 |
| 6,480,963 B1 | 11/2002 | Tachibana et al. .......... 713/201 |
| 6,487,664 B1 | 11/2002 | Kellum ....................... 713/200 |
| 6,507,904 B1 * | 1/2003 | Ellison et al. ............... 712/229 |
| 6,622,150 B1 * | 9/2003 | Kouznetsov et al. ........ 707/200 |
| 6,633,963 B1 | 10/2003 | Ellison et al. ................. 345/76 |
| 6,643,698 B2 | 11/2003 | Holden et al. ............... 709/225 |
| 6,654,751 B1 * | 11/2003 | Schmugar et al. ............ 707/10 |
| 6,667,152 B2 * | 12/2003 | Miles et al. ................... 435/5 |
| 6,721,721 B1 * | 4/2004 | Bates et al. .................... 707/1 |
| 6,735,700 B1 * | 5/2004 | Flint et al. .................. 713/200 |

* cited by examiner

*Primary Examiner*—Diane D. Mizrahi
*Assistant Examiner*—Yicun Wu
(74) *Attorney, Agent, or Firm*—John A. Smart

(57) ABSTRACT

A system providing methods for anti-virus cooperative enforcement is described. In response to a request from a device for access to protected resources, such as a network or protected data, a determination is made as to whether an anti-virus policy applies to the request for access made by the device. If an anti-virus policy is applicable, information pertaining to virus protection available on the device is collected. The virus protection information that is collected is evaluated to determine whether the device is in compliance with the anti-virus policy. If the device is determined to be in compliance with the anti-virus policy, the device is allowed to access the protected resources.

65 Claims, 5 Drawing Sheets

SYSTEM AND METHODS PROVIDING ANTI-VIRUS COOPERATIVE ENFORCEMENT

RELATED APPLICATIONS

The present application is related to and claims the benefit of priority of the following commonly-owned provisional application(s): application Ser. No. 60/372,907, filed Apr. 15, 2002, entitled "System and Methods Providing Anti-Virus Cooperative Enforcement", of which the present application is a non-provisional application thereof. The present application is related to and claims the benefit of priority of the following commonly-owned non-provisional application(s): application Ser. No. 09/944,057 now pending, filed Aug. 30, 2001, entitled "System Providing Internet Access Management with Router-based Policy Enforcement", of which the present application is a Continuation-in-part application thereof; and application Ser. No. 10/159,820 now pending, filed May 31, 2002, entitled "System and Methodology for Security Policy Arbitration", of which the present application is a Continuation-in-part application thereof. The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing and, more particularly, to systems and methods for cooperative enforcement of anti-virus protections on computer systems connected to one or more networks, such as Local Area Networks (LANs) and Wide Area Networks (WANs), including the Internet.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network via Ethernet. More recently, however, an increasingly large number of business and individual users are using portable computing devices, such as laptop computers, that are moved frequently and that connect into more than one network. For example, many users now have laptop computers that are plugged into a corporate network during the day and are plugged into a home network during the evening. Computers can be connected to networks at home, at work, and in numerous other locations. Many users also have home computers that are remotely connected to various organizations from time to time through wide area networks (WANs), including the Internet. The number of computing devices, and the number of networks that these devices connect to, has increased dramatically in recent years.

In addition, various types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of users that are occasionally connected from time to time. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. For example, a user may connect his or her home computer to a corporate network through a virtual private network (VPN) which creates a secure session between the home computer and the corporation's network.

As more and more computers are connecting to a number of different networks (including the Internet), a whole new set of challenges face network administrators and individual users alike: previously closed computing environments are now open to a worldwide network of computer systems. Specific challenges, for example, include the following: (1) attacks by perpetrators (hackers) capable of damaging the local computer systems, misusing those systems, or stealing proprietary data and programs; (2) unauthorized access to external data (e.g., pornographic or other inappropriate Web sites); (3) infiltration by viruses and "Trojan horse" programs; and (4) employee abuse of business computer resources for unauthorized personal activities (e.g., accessing on-line games or streaming audio/video programs).

One mechanism traditionally used to address several of the above challenges is a firewall product. Traditional firewall products guard a boundary (or gateway) between a local network, such as a corporate network, and a larger network, such as the Internet. These products primarily regulate traffic between physical networks by establishing and enforcing rules that regulate access based upon the type of access request, the source requesting access, the connection port to be accessed, and other factors. For example, a firewall may permit access from a specific IP address or range (or zone) of IP addresses, but deny access from other addresses. However, one of the implications of the increasing number of devices occasionally connected to different networks is that traditional corporate firewall technologies are no longer effective. Traditional firewall technology guarding a network boundary does not protect against traffic that does not traverse that boundary. It does not regulate traffic between two devices within the network or two devices outside the network. A corporate firewall provides some degree of protection when a device is connected to that particular corporate network, but it provides no protection when the device is connected to other networks. In addition, a traditional firewall may not protect against intrusions originating from a remote device which is connected to a corporate (or similar) network.

More recently, a security measure that has been utilized by many users is to install a personal firewall (or end point security) product on a computer system to control traffic into and out of the system. An end point security product can regulate all traffic into and out of a particular computer. For example, an end point security product may expressly seek authorization from a user or administrator (or from a policy established by a user or administrator) for each network connection to or from a computing device, including connections initiated from the device and those initiated from external sources. This enables a user or administrator to monitor what applications on a device are accessing the Internet. It also enforces security by obtaining authorization for each Internet or network connection to (or from) the device.

Another protective measure implemented by many users and administrators is to install an anti-virus application on their machines to provide protection against infiltration by viruses and "Trojan horse" programs. An anti-virus application typically includes an engine which has a database or repository of virus information (typically referred to as "virus signatures") that enables identification of viruses and other malicious code. At specified intervals the anti-virus engine will scan the computer system to detect any files that match known virus signatures. The anti-virus engine may also analyze new files received, opened, or saved on the computer system in order to bar infiltration by viruses. For example, the anti-virus engine may check e-mail attachments received by the local system. Typically, the anti-virus engine analyzes all files that are to be stored locally before such files are saved to disk in an effort to avoid installation of files containing viruses. Anti-virus programs are currently available from a number of vendors, including Norton (Symantec), McAfee, and Trend Micro. Typically, these vendors of anti-virus programs also provide frequent virus signature updates (usually through provision of a virus-data definition or "DAT" file) as new viruses are discovered. The updated virus information in the DAT file received by a user is added to the local database or repository, enabling identification and avoidance of new viruses.

Although end point security and anti-virus products, when properly used, provide considerable protection to users and administrators of computer systems and networks, several problems remain. One problem is that if a machine connected to a corporate network (e.g., a remote client machine connected through a VPN gateway) is infected with a virus, it may infect other machines on the same network. An infected computer that is connected to a particular network (e.g., a corporate LAN) may put the entire network at risk. For instance, the computer may be infected with a virus that intentionally tries to spread itself to other machines in the network. One machine that is not running the correct anti-virus engine or is not equipped with current virus signature definitions may jeopardize the security of the entire network. Ensuring that machines are running current anti-virus programs is particularly important, as virus issues are very time sensitive. New viruses are frequently released that cannot be identified using older anti-virus engines and definitions. It becomes critical therefore to promptly update anti-virus applications on all machines in a network in a timely fashion before the network is infiltrated by a newly released virus.

Several currently available tools provide functionality for "pushing" program updates, including anti-virus engine and virus signature updates, to client machines. Typically, this is in the nature of a one-time broadcast of new anti-virus engine and/or virus definition (DAT file) updates. A number of anti-virus products also include functionality that automatically checks for the availability of updates from a vendor website and downloads any such updates to the client device. While these current solutions make updates available, they do not provide any mechanism for centralized enforcement of anti-virus policies. Existing solutions do not ensure that all machines accessing a network have installed and are using current versions of particular anti-virus products, nor do they ensure that two or more machines that are connected together are sufficiently protected against virus infiltration. For example, a Trojan horse routine on a client computer may intentionally deactivate the anti-virus engine on that machine. A user may also intentionally or unintentionally disable virus checking on the machine. Another concern is that these current solutions typically allow client machines to connect to a network before pushing updates to such client machines. These limitations make the network potentially vulnerable to malicious code on a client machine that is connected to the network.

What is needed is a solution that ensures that all machines connected to a server or a network, including client computers that are joining (e.g., remotely connecting to) a network, are using specified anti-virus products to protect against infiltration by viruses. This solution should verify that all machines connected to a network (or each other) are using current releases of both anti-virus engines and virus signature updates to provide appropriate protection to all users. The solution should also bar access to the network to non-compliant systems that are not using current versions of the required anti-virus programs. Ideally, the solution should be easy to use and should facilitate updating anti-virus engines and virus signature definitions on all systems as and when required in an efficient and time-sensitive manner. The present invention fulfills these and other needs.

GLOSSARY

The following definitions are offered for purposes of illustration, not limitation, in order to assist with understanding the discussion that follows.

Bluetooth: Bluetooth refers to the Bluetooth wireless specification, a communications standard for sending data to and from small wireless radio communications devices, such as notebook and handheld computers, consumer electronics, personal digital assistants, cellular phones and other portable, handheld devices. The Bluetooth specification includes both link layer and application layer definitions for product developers which support data, voice and content-centric applications. Devices that comply with the Bluetooth wireless specification operate in the unlicensed, 2.4 GHz radio spectrum ensuring communication compatibility worldwide. The Institute of Electrical and Electronics Engineers (IEEE) standards association has approved the Bluetooth specification for wireless personal area networks as IEEE standard 802.15.1 "Wireless MAC and PHY Specifications for Wireless Personal Area Networks (WPANs)", the disclosure of which is hereby incorporated by reference.

Endpoint security: Endpoint security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly access private network resources.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a Uniform Resource Locator (URL) in his or her browser, an HTTP command is sent to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is currently available via the Internet at http://www.w3.org/Protocols/. Additional description of HTTP is available in the technical and trade literature, see e.g., William Stallings, "The Backbone of the Web," BYTE, October 1996, the disclosure of which is hereby incorporated by reference.

HTTPS: HTTPS stands for Hypertext Transfer Protocol over Secure Socket Layer, or HTTP over SSL, a communications protocol designed to transfer encrypted information between computers over the World Wide Web. HTTPS involves the use of a Secure Socket Layer (SSL) as a sublayer under HTTP.

IPsec: IPsec is short for IP Security, a set of protocols developed by the Internet Engineering Task Force (IETF) to support secure exchange of packets at the IP layer. IPsec has been deployed widely to implement virtual private networks (VPNs). IPsec supports two encryption modes: Transport and Tunnel. Transport mode encrypts only the data portion (payload) of each packet, but leaves the header untouched. The more secure Tunnel mode encrypts both the header and the payload. On the receiving side, an IPSec-compliant device decrypts each packet. For further information on the IPsec protocol, see e.g., RFC 2411 "IP Security Document Roadmap," (November, 1998), the disclosure of which is hereby incorporated by reference. RFC 2411 is available from the IETF and is currently available via the Internet at www.ietf.org/rfc/rfc2411.txt.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MDF is available in "RFC 1321: The MD5 Message-Digest Algorithm," (April 1992), the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time.

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject can be permitted to gain access to a specific object. A security policy may be enforced by hardware and software systems that effectively implement access rules for access to systems and information. Further information on security policies is available in "RFC 2196: Site Security Handbook, (September 1997)," the disclosure of which is hereby incorporated by reference. In this document, "security policy" or "policy" refers to a set of security policies and rules employed by an individual or by a corporation, government entity, or any other organization operating a network or other computing resources.

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., "The SSL Protocol, version 3.0," (Nov. 18, 1996), from the Internet Engineering Task Force (IETF), the disclosure of which is hereby incorporated by reference.

VPN: VPN stands for Virtual Private Network, a network that is constructed by using public wires to connect nodes. For example, there are a number of systems that enable creation of networks using the Internet as the medium for transporting data. These systems use encryption and other security mechanisms to ensure that only authorized users can access the network and that the data being transmitted cannot be intercepted. For further description of a system providing authenticated access over a public network, see e.g., U.S. Pat. No. 6,324,648, "Secure gateway having user identification and password authentication," the disclosure of which is hereby incorporated by reference. For further information on virtual private networks, see e.g., RFC 2764, "A Framework for IP Based Virtual Private Networks," the disclosure of which is hereby incorporated by reference. VPN products are available from a variety of vendors. Representative vendors include Cisco Systems, Inc. of San Jose, Calif., Check Point Software of Redwood City, Calif., and Intel Corporation of Santa Clara, Calif.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0," (2nd Edition, Oct. 6, 2000) a recommended specification from the W3C, the disclosure of which is hereby incorporated by reference. A copy of this specification is currently available on the Internet at http://www.w3.org/TR/2000/REC-xml-20001006.

SUMMARY OF THE INVENTION

The system of the present invention provides methods for verifying that a device is in compliance with an anti-virus policy before the device is allowed to access protected resources, such as a network or protected data. In response to a request from a device for access to protected resources, a determination is made as to whether or not an anti-virus policy applies to the request for access made by the device. If an anti-virus policy is applicable, information pertaining to virus protection available on the device is collected. The information that is collected about the virus protection (e.g., a virus protection or anti-virus module) available on the device is evaluated to determine whether the device is in compliance with the applicable anti-virus policy or rules. If the device is determined to be in compliance with the anti-virus policy, the device is allowed to access the protected resources.

The system of the present invention includes a client module on a client computer system or device. When the client device requests access to protected resources, the client module invokes a supervisor module referred to as an "integrity server." The client module also provides information about the request to the supervisor module. The system also includes an interface module for obtaining information regarding virus protection available on the client device. The supervisor module, when invoked by the client module, requests information about the virus protection available on the client device. This information is collected by the interface module and returned to the supervisor module. The supervisor module evaluates the information to determines whether or not the client device is in compliance with applicable anti-virus rules. If the client device is found to be in compliance with the anti-virus rules, the client device is allowed to access the protected resources.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for desktop and server computers)

Figure 1:
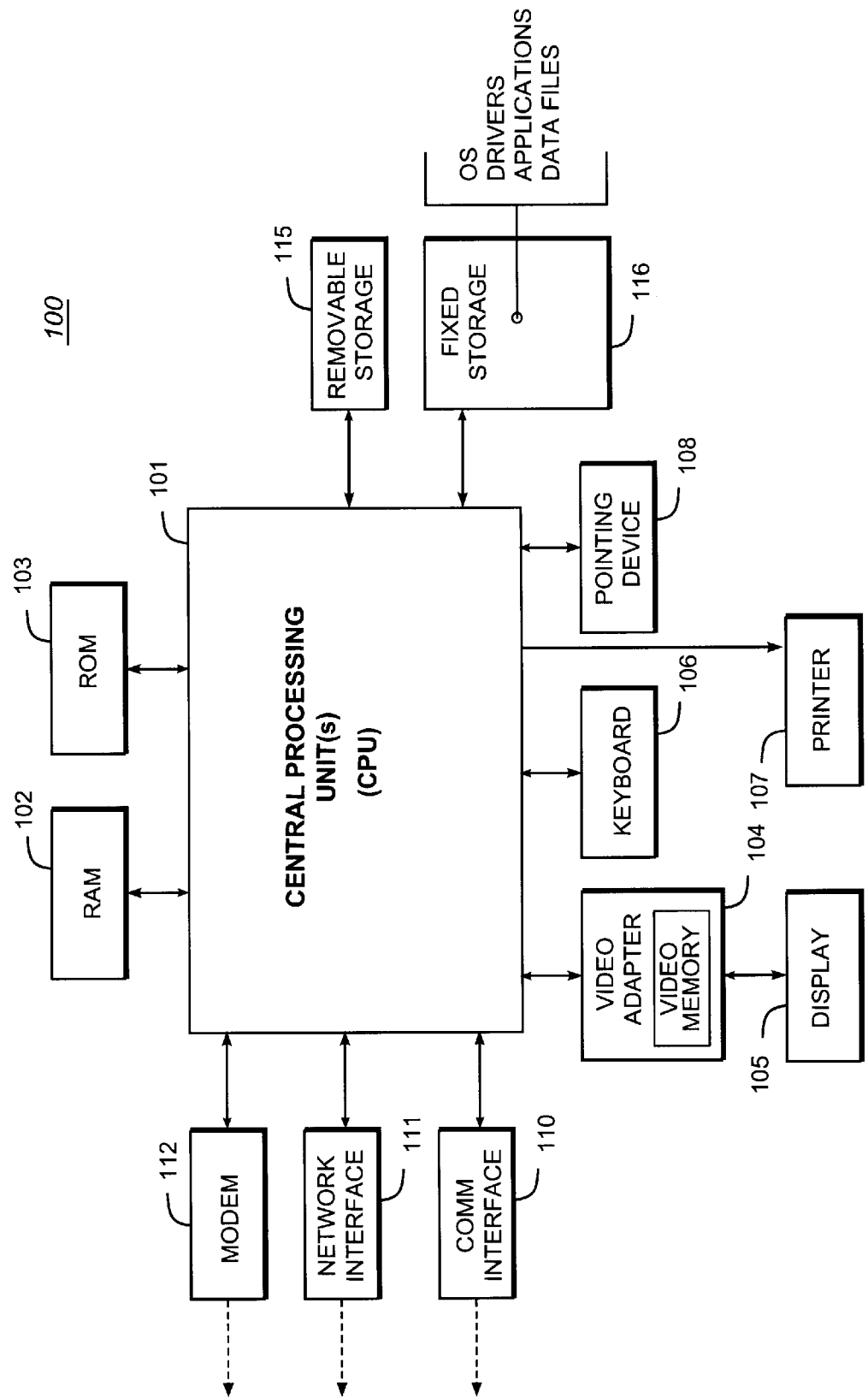
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device.

In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
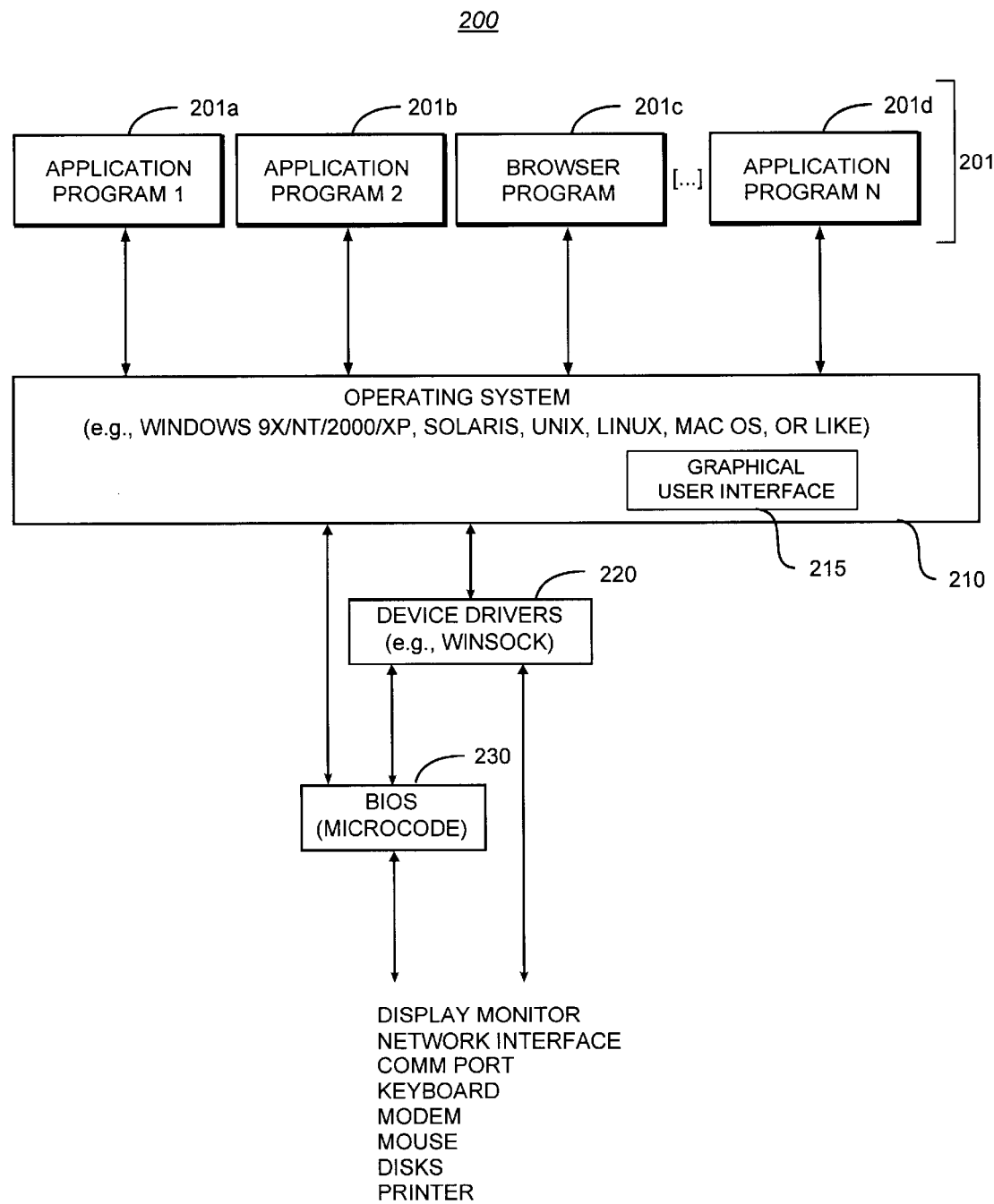
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Cooperative Anti-Virus Enforcement

A. Overview

The present invention includes a system providing improved methods for ensuring that computer systems and networks are protected against infiltration by viruses and other malicious code. Before a given computer system (e.g., a client computer) is permitted to join a network or access protected resources, a check is made to evaluate the anti-virus engine and virus definitions that are installed and in use on such computer system. For example, when a client computer requests a VPN connection to a gateway server, the system of the present invention determines whether or not a client computer is using an approved anti-virus application. The process of verifying that the client computer is operating a particular anti-virus program also includes automatically verifying that this program is up to date (i.e., neither the anti-virus engine nor the virus definition file are too old). The system and method of the present invention provides for this verification process to be efficiently performed in a manner that does not disrupt users of client computing devices or administrators of corporate networks. The present invention is flexible as it enables different compliance policies or rules to be applied to govern access to a network by different users or groups.

The present invention provides the ability to enforce compliance with virus protection policies or rules. Non-compliant systems that are not using current versions of the required anti-virus programs can be barred from accessing a network until they have installed and activated the required programs. In addition, the approach of the present invention is to provide assistance to non-compliant users to enable them to become compliant, rather than merely denying access to the network. A non-compliant user is informed about the nature of the problem and is assisted in fixing it. For example, a non-compliant user is typically redirected to a server (referred to below as a "sandbox server") at which the user is provided with information about how to remedy the non-compliance. The sandbox server can provide access to the required anti-virus updates or information about where such updates may be obtained. The system also facilitates updating anti-virus engines and virus signatures (i.e., virus definitions or "DAT" files) when required in an efficient and time-sensitive manner. The components of the currently preferred embodiment of the system of the present invention will now be described.

B. System Components and Basic Operations

1. System Environment

Figure 3:
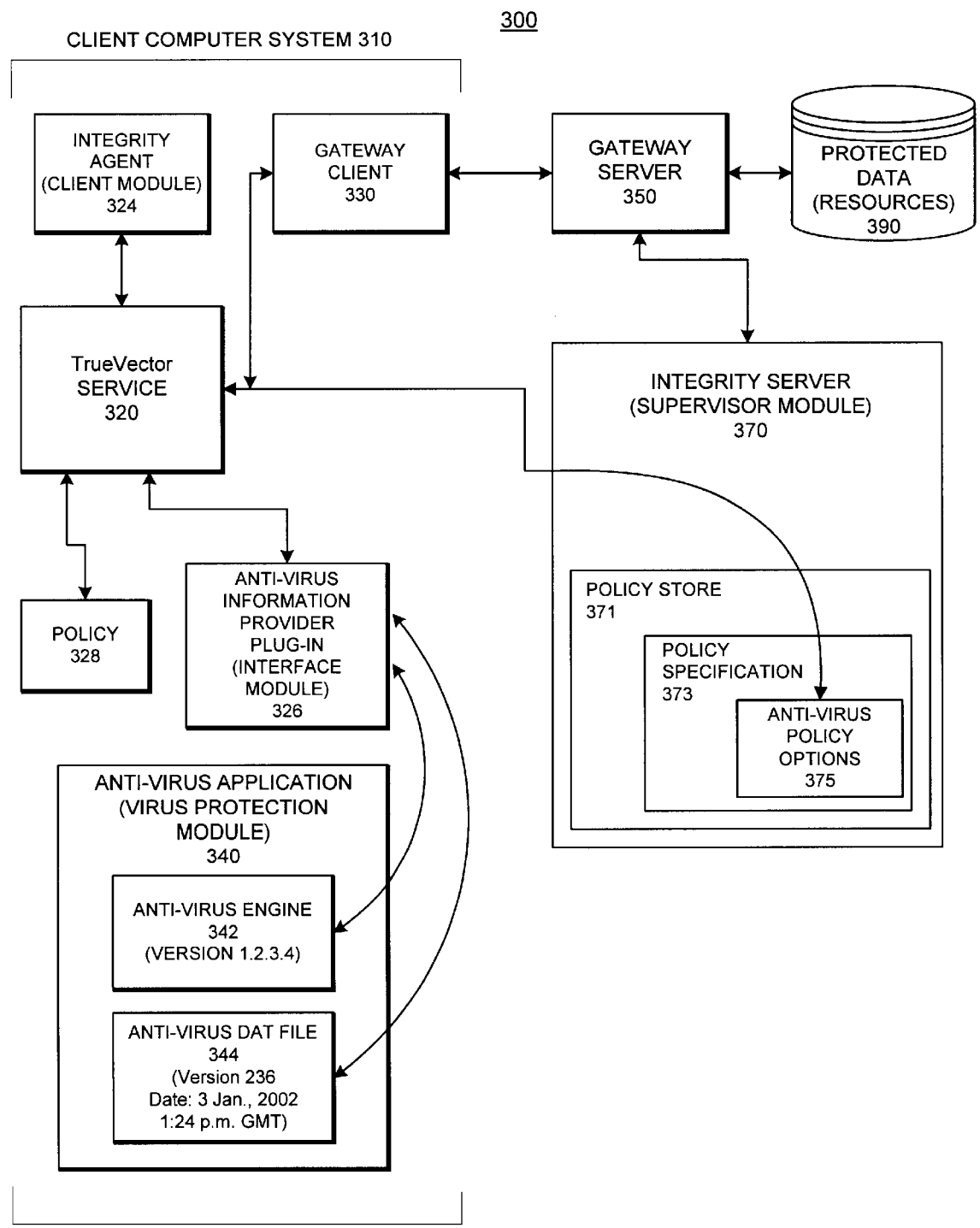
FIG. 3 illustrates an exemplary environment in which the present invention may be embodied.

FIG. 3 illustrates an exemplary environment 300 in which the present invention may be embodied. As shown, FIG. 3 includes a TrueVector® service (module) 320, a gateway client 330, an integrity agent 324, an anti-virus information provider plug-in ("AV plug-in") 326, a policy 328, and an anti-virus (AV) or virus protection application 340, all typically installed on a client computer or device 310. The anti-virus application 340 includes an anti-virus (AV) or virus protection engine 342 and an anti-virus (AV) definitions or DAT file 344. The environment 300 also includes a gateway server 350, an integrity server (supervisor module) 370, and a protected data or resources 390. The integrity sever 370 includes a policy store 371, a policy specification 373, and an anti-virus policy options 375.

2. Client Computer

The client computer 310 represents a personal computer (such as the previously described system 100), a computer server, a personal digital assistant, a desktop computer, a laptop computer, a notebook computer, or another type of computing device. The client computer 310 may connect to various machines and networks from time to time. For purposes of illustrating the operation of the present invention, the following description uses the example of a remote client device (i.e., the client computer 310) connecting through a virtual private network (VPN) to a gateway server 350 containing the protected data 390. The present invention, however, is not limited to any particular environment or device configuration. In particular, a VPN connection is not necessary to the invention, but is used to provide a framework for discussion. For example, the client computer 310 may alternatively connect to the gateway server 350 using a web browser. Also, the gateway server 350 may be a firewall, a VPN concentrator, a network router or switch, a web server, an ftp server, a file server, or the like. In addition, various different types of connections, including dial-up modems and various types of wireless connectivity, may be utilized to connect to different organizations. The present invention may be implemented in various environments in which two more computing devices interact with each other.

3. Gateway Client Connection to Gateway Server

The gateway client 330 serves as an interface to one or more gateway servers enabling the client computer 310 to remotely access a server or network. For instance, the gateway client 330 may be a VPN client installed on the client computer 310 for connection to a virtual private network (VPN). A user may utilize a VPN to connect the client computer 310 to his or her employer's network/remote server(s) over the Internet. Although the gateway client 330 is installed on the client computer 310 in this exemplary embodiment, the gateway client may alternatively be installed on a separate machine. For example, a VPN software client (e.g., Cisco VPN client software) may also be installed on a separate device (e.g., Cisco 3002 VPN hardware client), or on a firewall or router. In each of these situations, the gateway client 330 is a module that enables the client computer 310 to establish a connection to another machine or network. In the currently preferred embodiment, the gateway client 330 includes Cisco VPN Client for Windows, version 3.5.1 from Cisco Systems, Inc. of Santa Clara, Calif.

In response to a user request to establish a connection to a remote network or server, the gateway client 330 initiates communication with the gateway server 350. The gateway client 330 is typically used to connect to information that is protected by (and/or contained on) the gateway server 350. The gateway server 350 includes a module that listens for communications from client devices, such as the gateway client 330, and performs the tasks necessary for establishment of a session (e.g., a VPN session) for connection of the client computer 310. The currently preferred embodiment operates in conjunction with VPN 3000 Concentrator Series, which is VPN gateway software also from Cisco Systems. However, the present invention may also be used in conjunction with other VPN client and VPN gateway hardware and software products available from a number of other vendors. Representative vendors of VPN client and VPN gateway products include Check Point Software of Redwood City, Calif., and Intel Corporation of Santa Clara, Calif. The present invention may also be used with various other types of gateway clients and gateway servers, including, for example, web browsers connecting to web servers.

As shown at FIG. 3, the gateway client 330 (e.g., a VPN client or a web browser) on the client computer 310 is connected via a network protocol (e.g., IPSEC or HTTP/HTTPS) to the gateway server 350. The gateway server 350 acts as a gateway (e.g., a VPN gateway) to a group of resources or collection of data (e.g., the protected data or resources 390) and accepts requests for access to such resources from client machines. As shown, the gateway server 350 accepts a request for access to the protected data 390 from the gateway client 330 on the client computer 310. The gateway server 350 typically performs various steps to verify that the client computer 310 is authorized to access the protected data 390 (e.g., through user login and supply of a password) and to establish a secure session (e.g., using a Secure Socket Layer (SSL)) with the gateway client 330. However, the gateway server 350 is configured so that it will not permit complete access during the session unless it is instructed by a supervisor module, the integrity server 370, that this access is permissible. Assuming that the user is authorized, a connection is established between the gateway client 330 and the gateway server 350. Of particular interest to the present invention, the request for connection to the gateway server 350 by the gateway client 330 may also initiate action by the TrueVector service 320 and the integrity server 370 as hereinafter described.

4. TrueVector Service Notifies Integrity Server of Connection

The TrueVector® service or engine 320 is a module installed on the client computer 310 that is responsible for handling higher-level security and access rules. For example, the TrueVector service 320 may apply a rule that allows a connection from a particular application on a particular port of the client computer 310 to another machine or network. Basic operation of the TrueVector service 320 for monitoring and controlling access is described in commonly-owned U.S. Pat. No. 5,987,611, entitled "System and methodology for managing Internet access on a per application basis for client computers connected to the Internet," the disclosure of which is hereby incorporated by reference.

The TrueVector service 320 also includes an integrity agent or client 324. The integrity agent 324 of the TrueVector service 320 communicates with the integrity server 370 for cooperative anti-virus enforcement as hereinafter described. The integrity agent is a client module on a client device that works in conjunction with a supervisor module (i.e., integrity server 370) which is typically installed on another device. The request for access by the gateway client 330 is reported to or detected by the integrity agent 324. Detection of requests for access may be implemented in a number of different ways. The gateway client 330 may notify the integrity agent 324 of the request for connection.

Alternatively, the integrity agent 324 and/or the TrueVector service 320 may notice requests for connection to the gateway server 350 made from the client computer 310. When the TrueVector service 320 learns of the connection, it sends a message or event notification to the integrity server 370 informing the supervisor module (i.e., the integrity server) of the connection.

5. Integrity Server Retrieves and Sends Policy Applicable to Client

The integrity server 370 includes several server-side components of the present invention. In the currently preferred embodiment, the integrity server 370 is preferably installed on a different machine than the gateway server. The integrity server 370, which supports the methods of the present invention, communicates with a gateway server 350 to enforce the anti-virus policy that is established by a user or administrator. However, the integrity server 370 may also be installed on the same machine as the gateway server 350. It should also be noted that the currently preferred embodiment of the present invention is not itself an anti-virus engine that attempts to detect viruses. Rather, the client-side and server-side components of the present invention communicate with anti-virus applications and endeavor to ensure that these anti-virus applications are appropriately and consistently utilized to deter infiltration of systems and networks. However, the functionality of the present invention may be advantageously incorporated/embedded as part of an anti-virus application or as part of a gateway server (e.g., a VPN gateway or the like). Thus, those skilled in the art will appreciate that the system and methods described herein may also be used in a number of different configurations for achieving the present invention.

The integrity server 370 is a supervisor module which ensures that all users accessing a particular system or network comply with specified security policies, including access rights and cooperative anti-virus enforcement. The integrity server 370 also serves an enforcement role. In the currently preferred embodiment, the integrity server 370 can advise the gateway server 350 to deny a request for access to protected resources or allow such request (i.e., permit connection). The rules enforced by the integrity server 370 may also be changed from time to time by a user or administrator (e.g., in response to certain events, such as a threat from a serious virus that has been released and is "in the wild"). For example, a network administrator may require all users accessing the network to implement a virus definition update (e.g., DAT file) that is targeted at a particular virus. Thus, the administrator may implement a virus-definition update in a manner that is much more efficient than sending a broadcast message to all users informing them of the need to update their virus protection programs.

When the integrity server 370 receives notice of a connection to gateway server 350, the integrity server 370 evaluates whether or not the user making the request (e.g., client computer 310) should be permitted to access protected resources (e.g., a private network) under applicable security policies. More particularly, in response to the message received from the TrueVector service 320, the integrity server 370 retrieves the appropriate policy specification 373 applicable to the client computer 310 from the policy store 371. Of particular interest to the present invention, the policy specification 373 that is retrieved includes the anti-virus (AV) policy options 375. The anti-virus policy options 375 include policies or rules specifying particular AV applications required to be in place (if any) on the client computer 310. These anti-virus rules can be assigned in a number of different ways, including per connection, by individual connection, by network location, by user, by group, or by computer. A typical AV rule specifies a minimum DAT file version, a minimum DAT file date and/or a minimum AV engine version that must be used in order to obtain access to the network or protected data 390. The policy can also specify that the minimum DAT file date must be within a pre-defined period of time from the current date, the date of the initial session creation, or the date of the current version of the DAT file which is discovered from a specified agent. After retrieving the policy specification 373 from the policy store 371, the integrity server 370 sends the policy specification 373, including the AV policy options 375, to the TrueVector service 320 on the client computer 310 in response to the message previously sent by the TrueVector service.

6. TrueVector Service Determines if Policy Includes Anti-virus Rules

The TrueVector service 320 receives the policy specification 373, stores it locally as the policy 328, and checks to determine if the policy 328 includes any anti-virus policies or rules. In other words, the TrueVector service 320 determines whether this policy 328 includes a rule requiring an anti-virus application to be utilized on the client computer 310. If an anti-virus rule is included in the policy 328, the TrueVector service 320 calls the anti-virus information provider plug-in (AV plug-in) 326. In the currently preferred embodiment, the AV plug-in 326 is implemented as a driver that serves as an interface to anti-virus or virus protection applications of various vendors (e.g., the AV application 340) enabling the TrueVector service 320 to obtain certain information regarding the virus protection module (if any) that is installed and currently operating on the client computer 310.

7. Anti-virus Information Retrieved Using AV Plug-in

As shown at FIG. 3, the AV plug-in 326 is an interface module which retrieves version and/or publication date information from the AV application (or virus protection module) 340 that is installed and operating on the client computer 310. As previously described, a virus protection module (e.g., AV application 340) typically includes a virus protection or AV engine together with a repository containing virus definition or virus signature information. An anti-virus engine (e.g., AV engine 344) can usually be identified by version number and/or publication date. A vendor may encapsulate an anti-virus engine or virus protection module into several separate products. Nevertheless, the vendor name and version number or date of publication enable the AV engine to be specifically identified. Anti-virus enforcement also depends on virus pattern or signature files (also known as DAT files) which describe pattern characteristics of a collection of viruses. These DAT files are usually distributed by the vendor that published the AV application. Like AV engines, the DAT files can be identified by publication date and/or by version number. As shown, anti-virus application 340 includes anti-virus engine 342 and anti-virus DAT file 344. The information retrieved by the interface module (i.e., AV plug-in 326) usually includes the supplier and version number (or date of publication) of the AV engine 342 together with the anti-virus DAT file 344 version number, publication date, and/or publication time.

8. Anti-virus Information Sent to Integrity Server

The TrueVector service 320 retrieves this information regarding the virus protection module via the AV plug-in 326 and sends the information to the integrity server 370. The integrity agent 324 of the TrueVector service 320 communicates with the integrity server 370 and provides it with evidence that the appropriate anti-virus application is running on the client computer 310. As shown at FIG. 3, this information can be reported by the integrity agent 324 by a means separate from the normal connection between the gateway client 330 and the gateway server 350 (i.e., made directly to the integrity server 370). The information can be presented as an Extensible Mark-up Language (XML) document, a certificate containing an embedded attribute(s), or in another appropriate form. From time to time, the integrity agent 324 may also update the current anti-virus information and present this updated anti-virus information to the integrity server 370. This enables the integrity server 370 to determine whether or not to assign a new session access policy to the client computer 310 based on the new anti-virus information received from time to time. In the currently preferred embodiment, the integrity agent 324 on the client computer 310 does this regularly though a "heartbeat" mechanism as hereinafter described. The integrity server 370 can also send periodic requests for a heartbeat to each client device (e.g., client computer 310) connected to the gateway server 350. The integrity server 370 requests each connected computer system to respond with a heartbeat message providing specified information to the integrity server within a specified time period. In the currently preferred embodiment, the heartbeat message sent by the client device in response to the request from the integrity server generally includes information regarding the security policy version, the anti-virus engine provider and version, and the virus definition (DAT) file version and publication date available on the client device. This anti-virus information enables the integrity server to evaluate compliance with the applicable anti-virus policy as hereinafter described.

9. Integrity Server Evaluates Compliance with Anti-virus Rules

The integrity server 370 checks the anti-virus information received from the TrueVector service 320 to determine whether the anti-virus application currently in use on the client computer 310 complies with the requirements of the policy specification 373. The integrity server generally evaluates whether the installed anti-virus engine 342 is from an approved supplier, and whether the currently running version of this engine and the currently installed anti-virus DAT file 344 are within the limits established in the anti-virus policy options 375 section of the policy specification 373. In other words, a check is made to determine whether or not the anti-virus engine and virus definitions in use by the client computer 310 are from an approved supplier and are not out of date (i.e., not too old).

A variety of different approaches may be used for determining whether or not an anti-virus application is out of date. The integrity server 370 may query the anti-virus vendor's web site to determine the latest version of the AV engine and DAT files. However, this approach requires a different updating mechanism for each anti-virus vendor's application (given that the vendor web sites are usually in different formats). Alternatively, the integrity server can retrieve the date and/or version information from one or more of the client devices as they connect (i.e., from the integrity agent and TrueVector service on each client device). The integrity server generally selects the latest of the versions or dates on any client device for purposes of determining the latest version of such anti-virus programs. A user or administrator can also designate a specific agent to collect current version information. The integrity server can then consult the specified agent to determine the current version. As many client devices (including one operated by the system administrator) are configured to retrieve the anti-virus updates from the anti-virus vendors frequently (every few minutes or every day for example), this is an effective approach for determining the most current versions of the anti-virus applications that are available. The integrity server may then evaluate compliance based upon comparing the version then in use on a particular computer system with the most current version determined as described above.

After the integrity server 370 has evaluated compliance with anti-virus policies or rules, it notifies the gateway server about whether to permit or restrict access by this particular client device. The gateway server may then decide how much access to permit by this particular client device (i.e., the gateway server 350 assigns an access policy to the connection/session between the gateway server 350 and the client computer 310) based upon the notification from the integrity server 370. The integrity server may subsequently reevaluate the decision to permit access (and possibly restrict one or more client devices) at a defined frequency interval, when a user or administrator declares or repeals a virus emergency (or virus alert response), or when other significant events occur.

In the currently preferred embodiment, the integrity server 370 includes a user interface (not shown) that allows a system administrator or user to declare a "virus emergency" or "virus alert response" situation. Typically, the date and time of a virus emergency is established by a system administrator. The status of "virus emergency" in the integrity server generally imposes the requirement that all users (i.e., connected client devices) must have anti-virus engine (s) and/or DAT file(s) that are current or newer than the date and time of the given emergency. All clients (e.g., client computer 310) that are currently connected to the gateway server 350 are automatically reevaluated for compliance with this emergency rule and access may be restricted based upon their new compliance status. When the virus emergency is deactivated, the emergency requirement is removed and the normal requirement remains in effect. All clients that are connected when the virus emergency is deactivated are again reevaluated for compliance, and may or may not be restricted from access depending on the new compliance status.

10. Integrity Server Advises Gateway Server Whether to Permit Access

If the client computer 310 is in compliance with the policy specification 373 (including anti-virus policy options 375), the integrity server 370 sends a message to the gateway server 350 to permit the gateway client application 330 to access the protected data or resources 390. The client computer 310 may be fully authorized to access the protected data 390 or may be provided with more restricted access. If a client (e.g., client computer 310) is in compliance, a non-restrictive policy is usually assigned to such client. However, if the client is out of compliance, a restrictive policy is generally applied. The gateway server 350 may include one or more predefined policies that define what access is to be afforded to non-compliant clients. Access policies may be tailored for particular clients or groups and applied by the gateway server. In the currently preferred embodiment, a restrictive policy is usually applied to prevent access through the gateway to any resource except a "sandbox" server (not shown at FIG. 3). Depending on the type of gateway, this restriction can be based on the IP addresses that can be accessed or based on a web URL pattern (if a web server) or subdirectory. The integrity server may also instruct the gateway server to change the access policy to be applied to a particular session from time to time (e.g., to restrict a client determined to no longer be in compliance with anti-virus requirements).

11. Non-compliant Client Redirected to Sandbox Server

The "sandbox" server (not shown) is a server that informs the user of a client device about non-compliance issues (e.g., non-compliance with anti-virus requirements) and assists the user in remedying the non-compliance. For example, the sandbox server may provide the user with access to updates of the anti-virus application or information on how to obtain such updates. In the currently preferred embodiment, the sandbox server is implemented as a web server. A user that is non-compliant is redirected to this web server, which informs the user of the non-compliance and provides information about how to go about updating the anti-virus application.

C. Handling a Request for Access to Protected Data or Resources

Figure 4A:
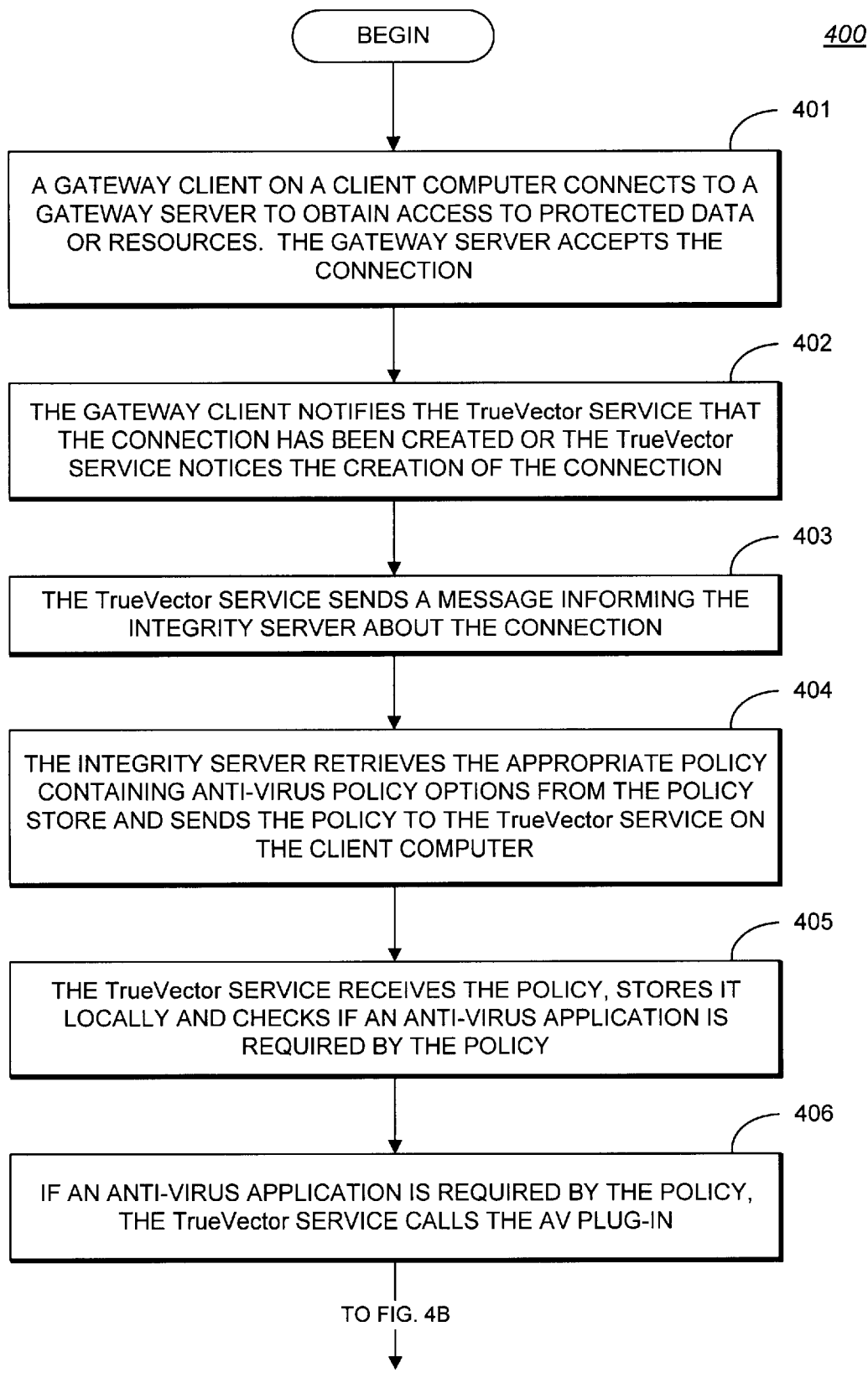
FIGS. 4A–B comprise a single flowchart illustrating the detailed method steps of the operations of the system of the present invention in handling an exemplary request for access by a client device to protected data or resources.
Figure 4B:
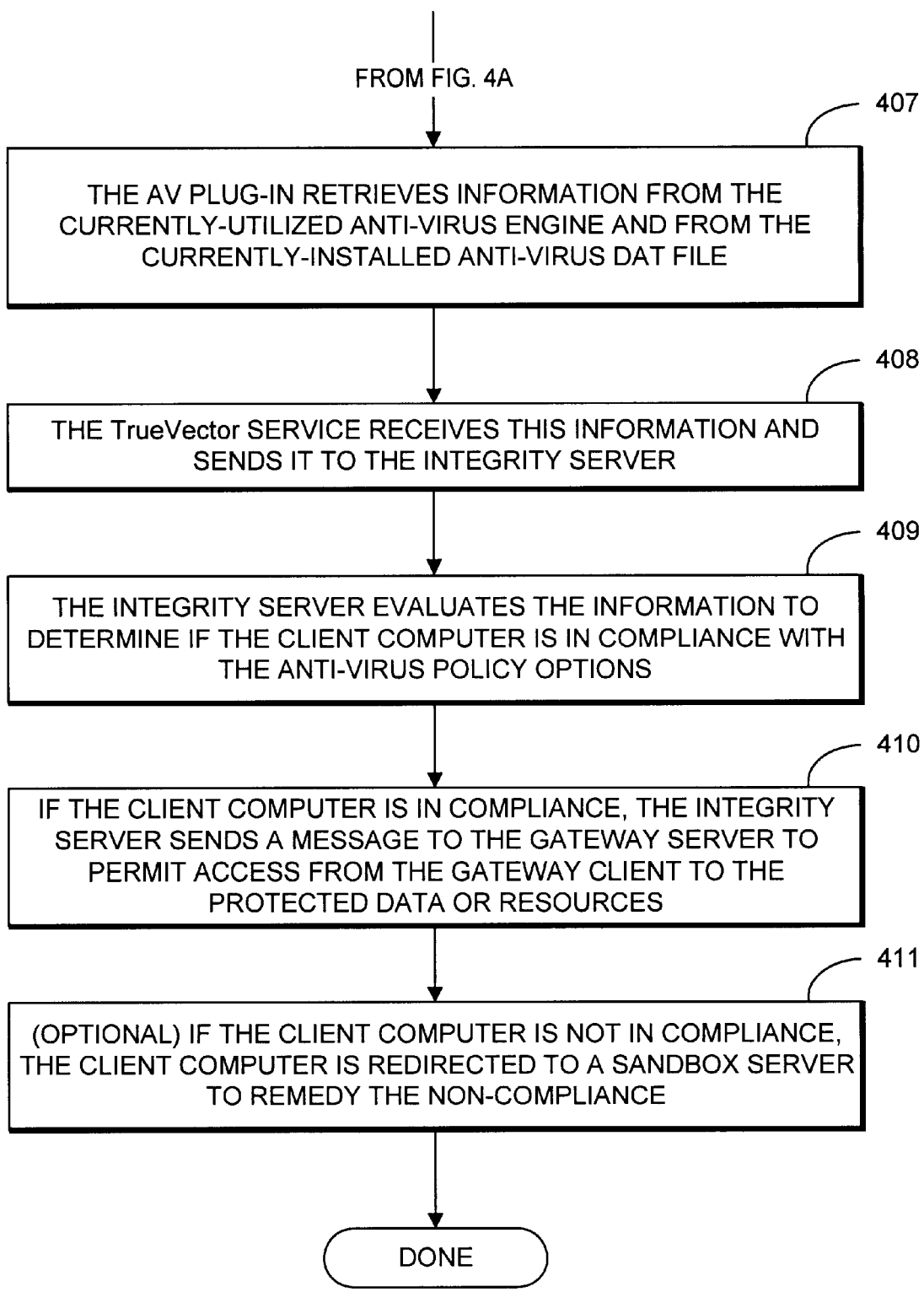

To further illustrate the operations of the present invention, the specific steps involved in handling an exemplary request for access to protected resources using the methods of the present invention will now be described. FIGS. 4A–B comprise a single flowchart illustrating the detailed method steps of the operations of the system of the present invention in handling an exemplary request for access by a client device to protected data or resources. For purposes of illustration, FIGS. 4A–B and the following discussion use the example of a client device (e.g., client computer 310 as shown at FIG. 3) remotely connecting to a gateway server (e.g., gateway server 350 as shown at FIG. 3) in order to access protected data or a protected network (e.g., the protected data 390) served by the gateway server. The present invention, however, is not limited to any particular environment or device configuration. In particular, a remote connection to a server or network is not necessary to the invention, but is used to provide a framework for discussion. The method steps described below may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The method 400 begins at step 401 when a gateway client on a client device connects to a gateway server via a network protocol (e.g., IPSEC or HTTP/HTTPS) in an attempt to access data or resources (e.g., a network) protected by the gateway server. For example, a client device may use VPN client software to connect to VPN gateway software on the server. The gateway server accepts the connection from the client device. At step 402, the gateway client on the client device notifies (or is noticed by) the integrity agent of the TrueVector service that a connection to the gateway server has been created. The function providing notification to the integrity agent is described in more detail below. Alternatively, the integrity agent or TrueVector service may notice connection requests made by the gateway client to the gateway server.

When the TrueVector service learns of the connection to the gateway server, at step 403 the TrueVector service sends a message to the integrity server associated with this gateway server informing the integrity server about the connection. As previously described, the integrity server may be on the same machine as the gateway server or on a separate machine. When the TrueVector service notifies the integrity server of the connection to the gateway server, the integrity server commences the process of evaluating whether or not the client device should be allowed to access the protected data or resources. The integrity server first identifies the policies that are applicable to the client device. At step 404, the integrity server retrieves a policy specification containing anti-virus policy options applicable to this particular client device from a policy store. It should be noted that a policy specification may be configured not to require any anti-virus enforcement for one or more clients, as desired. The integrity server then sends this policy specification (including the anti-virus policy options) to the TrueVector service on the client device.

When the TrueVector service receives the policy specification from the integrity server, at step 405 it stores a copy of the policy specification locally and determines whether or not an anti-virus policy or rule is required by the policy specification. The policy specification may, for example, contain an anti-virus rule requiring that a particular anti-virus application is installed and operational on the client device. If an anti-virus rule is required, at step 406, the TrueVector service calls the anti-virus information provider plug-in (AV plug-in) to obtain information about the anti-virus application that is currently in use on the client device. In response, at step 407 the AV plug-in typically retrieves version (or publication date) information from the currently-installed and running anti-virus engine(s) as well as version and date information from the most recently installed anti-virus DAT file(s) on the client device.

At step 408, the TrueVector service receives this information from the AV plug-in and sends the information to the integrity server. The information regarding the anti-virus application running on the client device is sent to the integrity server to enable the integrity server to evaluate whether or not the client device is in compliance with the anti-virus rule required by the applicable policy specification. After receipt of this information from the TrueVector service, at step 409 the integrity server reviews the information about the anti-virus application installed on the client device to determine if such anti-virus application complies with the anti-virus rule of the policy specification. Typically, this involves verifying that the client is using an approved anti-virus application and that the versions of the anti-virus engine and DAT file in use on the client device are not out of date.

If the integrity server determines that the client device is in compliance with the anti-virus rule, at step 410 the integrity server notifies the gateway server that it may permit access from the client device (i.e., the gateway client initiating the request) to the protected data or resources served by the gateway server. It should be noted that the integrity server may also enforce other access policies or rules (e.g., security policies that are contained in the policy specification) in addition to any applicable anti-virus rule. For example, a policy may require a particular client device to have an operational end point security product and enforce particular access or security policies as a condition to obtaining access to a corporate network. The integrity server may also deny access to the client (or cause access to be denied) if it is not in compliance with these other policies or rules. As previously described, the gateway server may permit full access from a compliant client device to the protected resources or may provide access subject to certain restrictions. The client can now perform authorized activity with the protected resources.

On the other hand, if the integrity server determines that the client device is not in compliance with the applicable anti-virus rule at step 409, at optional step 411 the integrity server may cause the client device to be redirected to a sandbox server to address the non-compliance. The role of the sandbox server is to assist the client in correcting the non-compliance. For example, a user of a client device may be informed that access to a network is denied because the anti-virus application on the client device is non-compliant. The sandbox server can be used to inform the user about how to obtain the necessary updates to the anti-virus application to enable the client to obtain access to the network. Exemplary methods, embodied in the Java and C/C++ programming languages, for implementing the foregoing steps will next be described in detail.

D. Interaction of System Components in Response to Client Connection

The following discussion illustrates the interaction of the components of the system of the present invention in handling an attempt by a client device to access resources protected by a gateway server. As described above, when a gateway client on a client device connects to a gateway server to access protected resources, the gateway client notifies the integrity agent. Alternatively, the integrity agent and/or the TrueVector service may notice requests for connection to the gateway server made by the gateway client. The following tvIntegrityClientNotification of the currently preferred embodiment provides notification of a change in session status:

```
 1: //    Function: tvIntegrityClientNotification
 2: //       Notifies the Integrity client of a change in session status.
 3: //    Parameters:
 4: //       ptvNotification: Points to a TV_IC_NOTIFICATION
 5: //          structure, which contains information about which message
 6: //          is being sent, and its parameters.
 7: //    Returns:
 8: //          TRUE if successful, FALSE if an error occurred.
 9: //          Call GetLast Error( ) for more information.
10: //    Comments:
11: //
12: BOOL WINAPI tvIntegrityClientNotification( PTV_IC_NOTI-
FICATION ptvNotification )
13: {
14:     if (! ( ptvNotification && (ptvNotification->dwSize >=
sizeof(TV_IC_NOTIFICATION) ) ) )
15:     {
16:         SetLastError(ERROR_INVALID_PARAMETER);
17:         return FALSE;
18:     }
19:
20:     switch ( ptvNotification->tvinEventCode )
21:     {
22:         case tvinBeginSession:
23:             if ( ptvNotification->dwSize != sizeof(
TV_IC_NOTIFICATION_BEGIN ) )
24:             {
25:                 SetLastError(ERROR_INVALID_PARAMETER);
26:                 return FALSE;
27:             }
28:             return StartSession( (PTV_IC_NOTIFI-
CATION_BEGIN) ptvNotification );
29:             break;
30:
31:         case tvinSessionClosing:
32:         case tvinSessionClosed:
33:         {
34:             if ( ptvNotification->dwSize != sizeof(
TV_IC_NOTIFICATION_SESSIONCLOSE ) )
35:             {
36:                 SetLastError(ERROR_INVALID_PARAMETER);
37:                 break;
38:             }
39:
40:             if ( ptvNotification->tvinEventCode ==
tvinSessionClosing )
41:                 return SendGatewayNotify( "closing", ptvNoti-
fication->szSessionId );
42:             else
```

-continued

```
43:                 return SendGatewayNotify( "closed", ptvNoti-
fication->szSessionId );
44:
45:             break;
46:         }
47:
48:     default:
49:         SetLastError(ERROR_INVALID_PARAMETER);
50:     }
51:
52:     return FALSE;
53: }
54:
```

The above tvIntegrityClientNotification function informs the integrity client or agent of a change in the status of a session. When a device connects to, or disconnects from, a gateway server, the connection event causes a "notification" to be sent to the integrity client or agent. The types of notification that may be sent include a notification that a session is beginning or starting, a notification that a session is closing (i.e., about to close), or a notification that a session is closed. As shown at line 12 above, a TV_IC_NOTIFICATION data structure is received which contains information about the message being sent. The information about the message in this data structure includes the type of notification (i.e., beginning, closing, or closed). Commencing at line 20 is a switch statement that examines the event code received in the TV_IC_NOTIFICATION data structure. If the event code indicates a session is starting, then StartSession is invoked to return a Boolean (value) indicating that a session is starting as shown at line 28. If the event code indicates a session is closed, it will invoke a method called SendGatewayNotify and pass the session ID and a command verb indicating that it is closed as shown at line 43.

If a session is starting and StartSession is invoked, StartSession connects to the integrity sever using a Secure Socket Layer (SSL) connection. Once a connection is open to the integrity server, the following function is used to login to the integrity server and inform the integrity server about the new session:

```
 1: bool
 2: ISConnection::login ( const CHAR *szLoginInfo /*= NULL*/)
 3: {
 4:     if ( ! InitMonitorClient( ) )
 5:         return FALSE;
 6:     BOOL bLoginSent = FALSE;
 7:     BOOL bProxyLogin = FALSE;
 8:     faststring fstrPassword;
 9:     faststring fstrLanguage;
10:
11:     if ( szLoginInfo && szLoginInfo[0] )
12:         bProxyLogin = TRUE;
13:
14:     // Wait until now to modify the "last connected" time, since
15:     // m_hContext isn't valid until after InitMonitorClient( ).
16:     // Don't set time connected for proxy login; it's already been set
17:     // on the initial login, and it causes a deadlock since the client
(IAgent) is waiting for this call
18:     // to complete, but the Commit below waits for the client to respond
to a QEVT_CHG event
19:     if ((m_Socket != INVALID_SOCKET) && !bProxyLogin)
20:     {
21:         RulesStartModifyEx( m_hContext, m_dwRuleID);
22:         RulesSetPropDWordEx( m_hContext, m_dwRuleID,
PROPID_TIME_CONNECTED, GetCurrentDateTime( ) );
```

-continued

```
23:       RulesCommitModifyEx( m_hContext, m_dwRuleID);
24:   }
25:   DbgPrintf (ODF_INTEGRITY, "clientThread sending
      login msg . . . \n");
26:
27:   MONITOR_LOCK(lock, m_mutex);
28:
29:   ZL_MessagePad mp (m_SendEndpoint);
30:
31:   // Check for secondary login
32:   if ( bProxyLogin )
33:   {
34:       xmlstring xmlLogin( szLoginInfo );
35:       faststring fstrUserName = xmlLogin.xmldecode("userName");
36:       fstrPassword = xmlLogin.xmldecode("password");
37:       setLoginName( fstrUserName );
38:       fstrLanguage = xmlLogin.xmldecode("language");
39:       m_fstrSecondaryLogin = szLoginInfo;
40:   }
41:   else
42:       setLoginName ( "" );
43:
44:   mp.setUser ( getLoginName( ) );
45:
46:   ZL_Message *login_msg = mp.newMsg (
47:       (GetServerVersion( ) >
INTEGRITY_MESSAGE_PROTOCOL_VERSION_ZAMBONI) ?
48:           INTEGRITY_MESSAGE_PROTOCOL_VERSION :
49:           INTEGRITY_MESSAGE_PROTOCOL_VER-
              SION_ZAMBONI,
50:       (bProxyLogin)?IA_PROXY_LOGIN:IA_LOGIN,
51:       STATUS_OK, m_fstrSessionID.c_str( ),
m_fstrSessionKey.c_str( ) );
52:   login_msg->getData( )->password = fstrPassword;
53:
54:
55:   if (fstrLanguage.empty( ) ) { // if client didn't specify a language
56:
57:   fstrLanguage =
getLanguageString( LOCALE_SYSTEM_DEFAULT );
58:   }
59:   login_msg->getData( )->language = fstrLanguage;
60:
61:   SetMessageClientVersion( login_msg );
62:   calcRuleFileSignature( );
63:   SetMessagePolicyInfo( login_msg );
64:   SetMessageVirusInfo( login_msg );
65:
66:   lock.unlock( );
67:
68:   faststring extraXML;
69:   extraXML = login_msg->getData( )->zoneReport.GetXML( );
70:   extraXML += login_msg->getData ( ) ->virusReport.GetXML( );
71:
72:   try {
73:       bLoginSent = login_msg->send( extraXML.empty( ) ? NULL : &extraXML );
74:   } catch (. . .) {
75:       m_SendEndpoint->unlock( );
76:       delete login_msg;
77:       return false;
78:   }
79:
80:   if ( bLoginSent )
81:   {
82:       MONITOR_LOCK(lock, m_mutex);
83:       m_State = IA_SESSION_RESTRICTED;
84:       lock.unlock( );
85:   }
86:   delete login_msg;
87:   return true;
88: }
```

The above ISConnection::login function collects information about the client machine or device that is connecting to the gateway server and then sends this information to the integrity server. At lines 4–26 above, information is collected about the client device from the TrueVector engine. At line 29, a MessagePad object is created which is used for constructing a message. At line 46, a newMsg method of the MessagePad is called to manufacture a new message. The newly constructed message is then returned as a login message (ZL_Message *login_msg) in XML format. The parameters given to the newMsg method include the session ID, the session key, and the protocol version as shown at lines 47–51. Other information is also attached to the message as illustrated at lines 52–64, such as password, language, client version, current policy file signature, and information about policies and virus protection modules installed on the machine. At lines 69 and 70, the information is assembled into the XML message. At line 73 the message is sent to the integrity server. If the message is sent, at line 83 a status of (m_State=IA_SESSION_RESTRICTED) indicates that the message has been sent and that the integrity agent is now waiting for a reply. The session between the client and gateway is restricted pending determination by the integrity server as to whether or not the client will be permitted to access the protected resources.

In response to the message from the TrueVector service on the client device, the integrity server retrieves the appropriate policy specification from the policy store, including any anti-virus rules contained in this policy, and sends the policy information to the TrueVector service on the client device. The callback function for downloading the policy information to the client device is as follows:

```
 1: ZL_CallbackStatus
 2: ISConnection::DownloadCallback (ZL_MessageData *m)
 3: {
 4:     LOG_TRACE(" ( ISS_DOWNLOAD ) called from server. . .\n");
 5:     LOG_TRACE("Downloading policy from server\n");
 6:
 7:     char *buf = new char [m->datasize.val + 1];
 8:
 9:     SetTVAPIStatus( TV_IC_SESSIONSTATUS_DOWN-
           LOADING );
10:     int numBytes = m_RecvEndpoint->receiveData (buf,
           m->datasize.val);
11:     buf[m->datasize.val] = 0;
12:
13:     LOG_INFO("received %d bytes in download stream\n",
           numBytes);
14:     if (numBytes == m->datasize.val) {
15:
16:         try {
17:
18:             if (!ISConfigureBuffer( buf, numBytes )) {
19:                 SetTVAPIStatus( TV_IC_SESSIONSTATUS_CON-
                       NECTED );
20:             }
21:             else
22:                 SetTVAPIStatus( TV_IC_SESSIONSTATUS_DOWN-
                       LOADED );
23:
24:         } catch (. . .) {
25:             LOG_ALERT("Exception: failed to load rules blob");
26:         }
27:         delete buf;
28:         LOG_INFO ("leaving ISS_DOWNLOAD\n");
29:         return CB_OK;
30:     } else {
31:         LOG_ALERT("file download failed, will retry later. . .\n");
32:         delete buf;
33:         return CB_ERROR;
34:     }
35: }
36: }
```

The above DownloadCallback function is called when the client receives an ISS_DOWNLOAD message from the server. This function downloads policy information from the integrity server to the client device and processes the download. As shown at line 10, data is received and stored in a buffer. At line 18, a function called ISConfigureBuffer takes the information in the buffer and stores it in the policy database.

After the policy rules are received on the client device and stored locally, the TrueVector engine checks the policy to determine if the policy includes anti-virus rules. If the policy includes virus protection requirements, the client device is required to return status information about its virus protection module to the integrity server. For example, if the new policy requires the client device to advise the integrity server about the virus protection module in use on the client device, the status message sent to the integrity server must include information about the virus protection module. The following ISConnection::sendHeartbeat function sends a heartbeat message (i.e., a message containing status information) to the integrity server:

```
 1: void
 2: ISConnection::sendHeartbeat( )
 3: {
 4:     // Now, make a new message and send the stuff
 5:     MONITOR_LOCK(lock, m_mutex);
 6:     ZL_MessagePad mp (m_SendEndpoint);
 7:     mp.setUser ( getLoginName( ) );
 8:
 9:     ZL_Message *hb_msg = mp.newMsg (
10:     (GetServerVersion( ) > INTEGRITY_MESSAGE_PROTOCOL_VERSION_ZAMBONI) ?
11:         INTEGRITY_MESSAGE_PROTOCOL_VERSION :
12:         INTEGRITY_MESSAGE_PROTOCOL_VERSION_ZAMBONI,
13:         IA_HEARTBEAT,
14:         STATUS_OK, m_fstrSessionID.c_str( ),
                m_fstrSessionKey.c_str( ) );
15:     SetMessagePolicyInfo( hb_msg );
16:     SetMessageVirusInfo( hb_msg );
17:
18:     SetZoneEventInfo( hb_msg );
19:
20:     faststring extraXML;
21:     extraXML = hb_msg->getData( )->zoneReport.GetXML( );
22:     extraXML += hb_msg->getData( )->virusReport.GetXML( );
23:
24: ...
```

As shown at line 9 above, the newMsg method of the Message Pad (mp.newMsg) is called to manufacture a new message. As illustrated at line 13, the type of message that is manufactured is a heartbeat message. At line 22, the virus protection information is appended to the heartbeat message. Of particular interest at line 22, virusReport.GetXML() calls the GetSummary method of the AV plug-in of the appropriate anti-virus provider. An example of the operation of the GetSummary method of an AV plug-in to a particular provider (Trend Micro in this example) is described below. An additional portion of the above ISConnection::sendHeartbeat() function which sends information to the integrity server is described following the discussion of the GetSummary function.

The AV plug-in is an interface to the applicable anti-virus application installed on the client device. The AV plug-in is used to retrieve information about the AV engine and the currently-installed AV DAT file from a third party AV application. The operations of the AV plug-in are illustrated by the following GetSummary method which retrieves information from a Trend Micro anti-virus application:

```
 1:
 2: HRESULT STDMETHODCALLTYPE CTrendTVProvider::GetSummary( int format, BSTR *pSummary, int detail )
 3: {
 4:     HKEY hKeyRoot = HKEY_LOCAL_MACHINE;
 5:     faststring installDir;
 6:     faststring engineVer;
 7:     faststring datDate;
 8:     faststring normDatDate;
 9:     faststring datVer;
10:     faststring engineFile;
11:     faststring installDirRegPath;
12:
13:     #define PCC7NT_ROOT "SOFTWARE\\TrendMicro\\PC-cillinNT\\7.0"
14:     #define PCC795_ROOT "SOFTWARE\\TrendMicro\\PC-cillin98\\7.0"
15:
16:     #define OFSNT_ROOT "SOFTWARE\\TrendMicro\\PC-cillinNTCorp\\CurrentVersion"
17:     #define OFS95_ROOT "SOFTWARE\\TrendMicro\\OfficeScanCorp\\CurrentVersion"
18:
19:     char szSystemDir[ MAX_PATH ];
20:     GetSystemDirectory(szSystemDir, sizeof(szSystemDir));
21:
22:     if (IsWinNT( ))
23:     {
24:         if (RegGetValueStr( hKeyRoot, PCC7NT_ROOT, "Application Path", installDir ))
25:         {
26:             installDirRegPath = PCC7NT_ROOT;
27:
28:         }
29:         else if (RegGetValueStr( hKeyRoot, OFSNT_ROOT, "Application Path", installDir ))
30:         {
31:             installDirRegPath = OFSNT_ROOT;
32:
33:         }
34:
35:     }
36:     else // Win9x
37:     {
38:         if (RegGetValueStr( hKeyRoot, PCC795_ROOT, "Application Path", installDir ))
39:         {
40:             installDirRegPath = PCC795_ROOT;
41:
42:         }
43:         else if (RegGetValueStr( hKeyRoot, OFS95_ROOT, "Application Path", installDir ))
44:         {
45:             installDirRegPath = OFS95_ROOT;
46:
47:         }
48:
49:     }
50:
51:     if (RegGetValueStr( hKeyRoot, installDirRegPath.c_str( ), "Application Path", installDir ))
52:     {
53:         if (IsWinNT( ))
54:         {
55:             //look for the engine in c:\windows\system32\drivers\vsapint.sys
56:             //first, then in c:\officescan5\vsapint.sys.
57:
58:             engineFile = szSystemDir;
59:             engineFile += "\\drivers\\vsapint.sys";
60:
61:             long ff;
62:             _finddata_t fd;
63:             if ((ff = _findfirst( engineFile.c_str( ), &fd )) != -1)
64:             {
65:                 _findclose( ff);
66:             }
67:             else
68:             {
69:                 engineFile = installDir;
```

-continued
```
 70:         engineFile += "\\vsapint.sys";
 71:       }
 72:
 73:       APPINFO ai;
 74:       ZeroMemory( &ai, sizeof(ai));
 75:       ai.cbSize = sizeof(APPINFO);
 76:       GetAppInfo( engineFile.c_str( ), GAIF_FILEVERSION,
             &ai );
 77:
 78:       // turn all '-' in the version into '.'. This is because
 79:       // Trend uses '-' in the build number, but we want to make the
 80:       // format canonical.
 81:       strreplace( ai.fileVersion, sizeof(ai.fileVersion) , '-', '.');
 82:
 83:       engineVer = ai.fileVersion;
 84:     }
 85:    else
 86:    {
 87:      char vxdVer[100];
 88:
 89:      engineFile = installDir;
 90:      engineFile += "\\vsapi32.vxd";
 91:
 92:      if (VXDGetFileVersion( engineFile.c_str( ), vxdVer,
sizeof(vxdVer)))
 93:         {
 94:       // turn all '-' in the version into '.'. This is because
 95:       // Trend uses '-' in the build number, but we want to make the
 96:       // format canonical.
 97:         strreplace( vxdVer, sizeof(vxdVer), '-', '.');
 98:
 99:         engineVer = vxdVer;
100:       }
101:     }
102:
103:    if (engineVer.empty( ))
104:       return E_FAIL;
105:  }
106:  else
107:  {
108:    return E_FAIL;
109:  }
110:
111:
112:  char datPath[_MAX_PATH];
113:  _makepath( datpath, NULL, installDir.c_str( ),
        "\\LPT$VPN.*", NULL );
114:  _finddata_t fd;
115:
116:  long ff = _findfirst( datPath, &fd );
117:  if (ff == -1)
118:    return E_FAIL;
119:
120:  unsigned int latestDatVer = 0;
121:  time_t latestDatDate = 0;
122:  do {
123:    char ext[_MAX_EXT];
124:    _splitpath( fd.name, NULL, NULL, NULL, ext );
125:
126:    // get the number in the extension.
127:    unsigned int ver;
128:    if ((sscanf(ext+1, "%u", &ver ) != 1)
129:        && (ver > 0)
130:        && (ver <= 999))
131:       continue; // if not a real number, skip this file and go
to the next one
132:
133:    if (ver > latestDatVer) {
134:      latestDatVer = ver;
135:      latestDatDate = fd.time_write;
136:    }
137:  } while (!_findnext( ff, &fd ));
138:  _findclose(ff);
139:
140:  if (latestDatVer == 0)
141:  {
142:    return E_FAIL; // no dat file found. . .
143:  }
144:
```

-continued
```
145:    // convert the file's date to a normal date string.
146:    struct tm *datTM;
147:    datTM = gmtime( &latestDatDate );
148:    char szDatDate[100];
149:    wsnprintf( szDatDate, sizeof(szDatDate) , "%04d-%02d-%02d
       %02d:%02d:%02d +00:00",
150:      (datTM->tm_year + 1900),
151:      (datTM->tm_mon + 1),
152:      (datTM->tm_mday),
153:      datTM->tm_hour,
154:      datTM->tm_min,
155:      datTM->tm_sec );
156:
157:    normDatDate = szDatDate;
158:
159:    // convert the dat version to string
160:    char szDatVersion[20];
161:    _itoa( latestDatVer, szDatVersion, 10 );
162:    datVer = szDatVersion;
163:
164:    faststring result;
165:    result = "<provider type=\"";
166:    result += m_Name;
167:    result += "\" datDate=\"";
168:    result += normDatDate;
169:    result += "\" datVersion=\"";
170:    result += datVer;
171:    result += "\" engineVersion=\"";
172:    result += engineVer;
173:    result += "\" />";
174:
175:    *pSummary = result.GetBSTR( );
176:    return S_OK;
177:  }
```

If the anti-virus provider is Trend Micro, for instance, the CTrendTVProvider::GetSummary method shown above at line 2 is invoked. This method receives a format and how much detail is requested as input parameters (int format, int detail). The method returns a string containing information about the virus protection module on the client device. The method first collects information about the virus protection (or anti-virus) module on the machine. The collected information is then constructed into an XML message for return to the integrity server.

As shown at lines 22–49, a registry is examined to establish where the currently installed anti-virus module is located on the machine. Once the location of the anti-virus module is determined, information about the anti-virus module is obtained as shown at lines 53–101. For a Windows NT implementation, lines 58–60 evaluate what file should contain information about the anti-virus module. Lines 63–67 determine whether the file can be located. If the file is found, the function GetAppInfo is called as shown at line 76. GetAppInfo takes a given file name as input and returns version information. In particular, the flag GAIF_FILEVERSION returns the final version of the anti-virus module. In other words, if the file containing version information is found, then the version number stored in that file is obtained and returned. Lines 87–101 illustrate a similar process for a Windows 95/98 implementation. In the case of a Windows 95/98 implementation, the version information is likely to be included in a different file than for a Windows NT implementation.

Additional information is also collected for return to the calling function as illustrated in portions of the GetSummary method following line 101. For example, at lines 112–138 the version of the latest DAT file is obtained. At lines 145–162 the date of the DAT file is determined. At lines 164–173 an XML result string is manufactured to contain the data that has been collected. At line 175, this result is returned back to the calling ISConnection::sendHeartbeat() function.

After information on the anti-virus application is retrieved, the TrueVector engine sends this information to the integrity server using the below portion of the ISConnection::sendHeartbeat() function. The following is an additional portion of the previously described ISConnection::sendHeartbeat() function that handles periodic transmission of information (referred to as "heartbeat" messages) to the integrity server:

```
 1: ...
 2:
 3:     lock.unlock( );
 4:
 5:     try {
 6:         m_SendEndpoint->lock( );
 7:         hb_msg->send( extraXML.empty( )? NULL : &extraXML );
 8:         m_SendEndpoint->unlock( );
 9:     } catch ( . . . ) {
10:         DbgPrintf(ODF_INTEGRITY, "unable to send heartbeat\n");
11:         m_SendEndpoint->unlock( );
12:     }
13:     delete hb_msg;
14: }
```

As shown above at line 7, the information that has been collected is sent to the integrity server.

Upon receipt of the above information, the integrity server evaluates the information to determine if the anti-virus application in use on the client device is in compliance with the rules set forth in the anti-virus policy options of the applicable policy specification. The following routine illustrates the process of evaluating the anti-virus information received by the integrity server:

```
 1: /**
 2:  * Checks if at least one correct AV Provider version is on the
 3:  * client machine, if it is not then an alert is sent if the policy
 4:  * allows for alerts to be sent. <p>
 5:  * If the <code>Message</code> is a login message then the alert is
 6:  * not sent but instead a sendHeartbeatMessage is called.
 7:  * <p>
 8:  * If the <code>Message</code> is not a login instance and the
 9:  * client is not in compliance a flag is set to indicate
10:  * the client is out of compliance
11:  * @param <code>sessioinid</code> of the message.
12:  * @param <code>cxn<code>, the <code>AgentConnection</code>.
13:  * @param <code>Message</code> with a list of providers,
optionally. (heartbeat, login, proxylogin).
14:  * @return <code>true</code> if
<code>AgentConnection.isAVCompliant(providers)</code> or
15:  * <code>false</code> if no rules are compliant, or if
<code>m</code> is null.
16:  */
17: private ComplianceStatus checkClientAVCompliance(boolean
sendMessageOnFail)
18: {
19:     AVPModeler avpm =
PluginManager.getPolicyStudio( ).getAVPModeler( );
20:     AVPanic panic = avpm.getPanic( );
21:
22:     ComplianceStatus compliant =
avpm.isCompliant(getLastProviderInfo( ), getPolicy( ) , getUser( ));
23:     if (compliant != ComplianceStatus.COMPLIANT)
24:     {
25:         // only alert the user if he has not already been alerted
26:         // and this is a heartbeat message. The correct policy is
27:         // downloaded by the time the first heartbeat comes thru.
28:         if
(getPolicy( ).getChecksum(getHeaderVersion( )).equals(mLastPolicyChecksum))
29:         {
30:             // send message only if one has not already been sent
31:             // AND if message never sent before override
sendMessageOnFail if reason is AV_PANIC
32:             if ((!mSentUserAVAlert) && (sendMessageOnFail ||
compliant == ComplianceStatus.AV_PANIC))
33:             {
34:                 String message, reason = "av";
35:                 if (compliant == ComplianceStatus.AV_PANIC)
36:                 {
37:                     message = "A Virus Alert has been declared
by your System Administrator. "
38:                         + "Please update your anti-virus DAT file
immediately, "
39:                         + "or contact your System Administrator for
assistance.";
40:                     reason = "avemergency";
41:                 }
42:                 else if (compliant == ComplianceStatus.AV_NOPROVIDER)
43:                 {
44:                     message = "No approved anti-virus software has been
detected on your computer. "
45:                         + "Please install an approved anti-virus program, "
46:                         + "or contact your System Administrator for assistance";
47:                 }
48:                 else if (compliant ==
ComplianceStatus.AV_ENGINEVERSION)
49:                 {
50:                     message = "Your anti-virus software engine is not up to
date. "
51:                         + "Please upgrade your anti-virus engine, "
52:                         + "or contact your System Administrator for assistance";
53:                 }
54:                 else
55:                 {
56:                     message = "Your anti-virus software data is not up to
date. "
57:                         + "Please upgrade your anti-virus DAT file, "
58:                         + "or contact your System Administrator for assistance";
59:                 }
60:                 mSentUserAVAlert = informAgent(getSessionId( ), message,
reason);
61:             }
62:         }
63:         else
64:         {
65:             sendHeartbeatMessage( );
66:             return mAVCompliant; // do not change the compliance
state because the policy on the client is different
67:         }
68:
69:         // remember the status of the last compliance check
70:         return compliant;
71:     }
72:
73:     // remember the status of the last compliance check
74:     return ComplianceStatus.COMPLIANT;
75: }
```

The information that is received by the integrity server from the client device is evaluated by the checkClientAVCompliance method shown commencing at line 17 above. At line 22, a function named avpm.isCompliant is invoked. The avpm.isCompliant function receives information about the AV application (getLastProviderInfo()), the anti-virus policy to be applied (getpolicy()), and the client device (getuser()) as input parameters and returns a value named compliant which is a compliant status. The avpm.isCompliant function is described below.

The compliance value which is returned by avpm.isCompliant indicates the compliance status of the client device. The return value can indicate that no anti-virus module is installed on the client device, that the anti-virus engine is outdated, or another status indicating why the client device is not in compliance with the required anti-virus policy. Commencing at line 32 above is a special case for handling a system wide anti-virus emergency (indicated by an AV_PANIC compliance status). In the currently preferred embodiment, an administrator or user may declare a virus emergency which typically requires all client devices to respond with a heartbeat message providing status information. In the event of a virus emergency, the client is sent a message indicating that a virus emergency has been declared and the client should immediately update its anti-virus DAT file. Other examples of compliance status indications are shown at lines 42–60 above. For example, the status ComplianceStatus.AV_NOPROVIDER as shown at line 42 indicates that no approved anti-virus module is installed on the client device. If this is the case, a message is generated for transmission to the client informing the client that it does not have approved anti-virus software. At line 60, the message is sent to the client informing the client of the compliance status. The message is then typically displayed in a pop-up dialog box (i.e., the user interface) on the client device. Alternatively, if the client device is in compliance with all anti-virus requirements, then the value ComplianceStatus. Compliant is returned as shown at line 74.

The isCompliant method called at line of the above checkClientAvCompliance method is as follows:

```
 1: /**
 2:  * Compares the list of uploads to the rules for <code>p</code> and
 3:  * returnd <code>true</code> if at least one of the uploads is
compliant.
 4:  * @return <code>true</code> if <code>p</code> contains no
 5:  * rules or if <code>uploades</code> has at least one record that is
 6:  * compliant with one of the rules in <code>p</code>.
 7:  */
 8: public ComplianceStatus isCompliant(List uploads, Policy p. User u)
 9: {
10:   AVPModeler avpm =
      pluginManager.getPolicyStudio( ).getAVPModeler( );
11:   AVPanic panic = getPanic( );
12:   // set fail state to lack of AV_PROVIDERS until we know there is at
13:   // least one AVProviderInfo record.
14:   ComplianceStatus compliant =
      ComplianceStatus.AV_NOPROVIDER;
15:   // see if we have rules.
16:   AVPRule rules[ ] = p.getRuleArray( );
17:   if (rules == null || rules.length == 0)
18:   return ComplianceStatus.COMPLIANT;
19:   // see if we have active rules
20:   boolean hasActiveRules = false;
21:   for (int i = 0 ; i < rules.length ; i++)
22:   {
23:   if (rules[i].getActive( ))
24:   {
25:   hasActiveRules = true;
26:   break;
27:   }
28:   }
29:   // TRIVIAL CASE: if no active rules then all users are compliant.
30:   if (!hasActiveRules)
31:   return ComplianceStatus.COMPLIANT;
32:   // TRIVIAL CASE: if no uploads then this is not compliant.
33:   if (uploads == null || uploads.size( ) == 0)
34:   return ComplianceStatus.AV_NOPROVIDER;
35:   // NON TRIVIAL CASE: now we have 1+ uploads and 1+ rules,
      match them and see. . .
36:   // start with the uploads and find matching records. . .
37:   for (int i = 0 ; i < uploads.size( ) ; i++)
38:   {
39:   ProviderInfo pu = (ProviderInfo)uploads.get(i);
40:   if (pu instanceof AVProviderInfo)
41:   {
42:   // we have had at least one AV Provider to compliance fails to a
general state
43:   // case ensures we do not override previously set reasons.
44:   if (compliant == ComplianceStatus.AV_NOPROVIDER)
45:   compliant = ComplianceStatus.AV_NONCOMPLIANT;
46:   // check if the user is a special agent of the rules provider
```

-continued

```
47:   try
48:   {
49:   avpm.handleSpecialAgent(u, (AVProviderInfo)pu);
50:   } catch (Exception e) { }
51:   // Skip this provider if it fails panic test
52:   if (panic.getActive( ) &&
      ((AVproviderInfo)pu).getDatDate( ).com-
      pareTo(panic.getMinDATDate( )) < 0)
53:   {
54:   compliant = ComplianceStatus.AV_PANIC;
55:   continue;
56:   }
57:   for (int j = 0 ; j < rules.length ; j++)
58:   {
59:   if (pu.getType( ) == rules[j].getType( ) && rules[j].getActive( ))
60:   {
61:   compliant = rules[j].isCompliant(pu)
62:   if (compliant == ComplianceStatus.COMPLIANT)
63:   {
64:   Log.info(LogNLS.AVPMODELER_000,
      new Object[ ] {pu.getType( ).toString( ),
      rules[j].toString( ), p.getName( )});
65:   return compliant;
66:   }
67:   }
68:   }
69:   }
70:   }
71:   return compliant;
72:   }
73:
```

The isCompliant method evaluates whether a particular client device is in compliance with applicable policy requirements. As shown at line 8, the isCompliant method receives a list of information (referred to as uploads), which are XML snippets received from the calling function. These XML snippets include data about the anti-virus module on the client device. The data which is received is compared against the policy (Policy p) for a given user (User u). The policy (Policy p) specifies anti-virus compliance requirements. As shown at lines 16–18, a check is first made to determine if any anti-virus requirements are applicable. If the applicable policy does not have any anti-virus requirements (if (rules==null||rules.length==0)) , there is no need for further examination of the anti-virus data and the value of "compliant" (ComplianceStatus.COMPLIANT) is returned. Similarly, at lines 19–31 a check is made to determine if any of the anti-virus rules are active. If there are no active rules, then all clients are complaint. At lines 32–34, if there are rules, but no data is received (i.e., no uploads) regarding anti-virus modules on the client device, then the client is non-compliant and a status of ComplianceStatus.AV_NOPROVIDER is returned.

If the applicable policy contains active anti-virus requirements and uploads are received, then commencing at line 37 the anti-virus information received from the client device is compared to the anti-virus requirements of the policy. For example, the for loop starting at line 57 evaluates whether information received in the uploads indicates that the anti-virus module on the client device is compliant with each of the active rules of the anti-virus policy. Immediately before this for loop at lines 51–56 is a special case for handling a virus emergency (also referred to as a virus alert response) situation, which is indicated by a status of AV_PANIC. As previously described, an administrator or user may declare a virus emergency requiring a response from connected client devices. In the case of a virus emergency, a check is made as shown at line 52 to determine if the DAT file is out of date. A DAT file is out of date if it is older than the minimum day required by the administrator or user declaring the emergency.

If the client device is determined to be in compliance with the applicable policy, the integrity server sends a message to the gateway server to permit the client device to access the protected data, resources, or network served by the gateway server. The following function illustrates a session between the integrity server and gateway server for communication of this authorization to the gateway server:

```
 1:
 2:  /**
 3:   * Accept an IGW session -- sends ISS_IGW_AUTH_OK
 4:   */
 5:  public synchronized void acceptIGWSession (String sessionid)
 6:  {
 7:      SessionState ss = (SessionState)mSessionTable.get(sessionid);
 8:      if (ss != null)
 9:      {
10:          String gatewayid = ss.getGatewayId( );
11:          if (gatewayid != null)
12:          {
13:              IgwConnection gwCxn = (IgwConnection)mIGWConnections.get(gatewayid);
14:              if (gwCxn != null)
15:              {
16:                  gwCxn.acceptSession(ss.getGatewaySessionId( ));
17:              }
18:          }
19:      }
20:  }
```

The above function sends a "success message" to the gateway server if the client device is in compliance with applicable policies and is to be permitted to access protected data or resources. As shown at line 5, the acceptIGWSession function receives a session ID as a parameter. At line 16, the function calls a method named acceptSession on the gateway connection to notify the gateway server that a particular client device, which is identified by session ID, is authorized to access the protected data or resources. Recall that when the client device initially logged in to the integrity server, a restricted status was assigned to the client until the integrity server made a determination as to whether or not to permit access to the protected data. This restricted status generally continues until the integrity server issues notification that the client device is compliant or, alternatively, the client device disconnects from the gateway server.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for verifying that a device is in compliance with an anti-virus policy required in order to access protected resources, the method comprising:

in response to a request from a device for access to protected resources, determining whether an anti-virus policy is applicable to said device;

if an anti-virus policy is applicable to said device, retrieving information pertaining to virus protection available on said device;

determining whether said device is in compliance with said anti-virus policy based upon said information pertaining to said virus protection available on said device; and if said device is determined to be in compliance with said anti-virus policy, allowing said device to access said protected resources.

2. The method of claim 1, further comprising:

detecting requests from said device for access to protected resources.

3. The method of claim 1, wherein said step of determining whether an anti-virus policy is applicable to said device includes the substeps of:

detecting requests from said device for access to protected resources; and retrieving an anti-virus policy applicable to said device.

4. The method of claim 1, wherein said anti-virus policy includes a rule requiring a particular virus protection module to be available on said device.

5. The method of claim 1, wherein said anti-virus policy includes a rule requiring a particular virus definition file to be available on said device.

6. The method of claim 1, wherein said anti-virus policy includes a rule requiring a particular anti-virus engine to be available on said device.

7. The method of claim 1, wherein said step of retrieving information pertaining to virus protection available on said device includes retrieving said information using an interface to a virus protection module.

8. The method of claim 7, wherein said interface operates in conjunction with a plurality of virus protection modules.

9. The method of claim 1, wherein said step of retrieving information pertaining to virus protection available on said device includes retrieving information about a virus definition file.

10. The method of claim 1, wherein said step of retrieving information pertaining to virus protection available on said device includes retrieving information about an anti-virus engine.

11. The method of claim 1, wherein said step of determining whether said device is in compliance with said anti-virus policy includes evaluating information about an anti-virus engine.

12. The method of claim 1, wherein said step of determining whether said device is in compliance with said anti-virus policy includes evaluating information about a virus definition file.

13. The method of claim 1, wherein said step of determining whether said device is in compliance with said anti-virus policy includes comparing information about virus protection available on said device with information about virus protection available on at least one other device.

14. The method of claim 1, wherein said step of determining whether said device is in compliance with said anti-virus policy includes the substeps of:

retrieving virus protection information from at least one other device; and comparing virus protection information about said device with virus protection information retrieved from said at least one other device.

15. The method of claim 1, wherein said step of allowing said device to access said protected resources includes notifying a gateway server to permit access to said protected resources.

16. The method of claim 1, wherein said step of allowing said device to access said protected resources includes assigning an access policy to said device, said access policy specifying protected resources that can be accessed by said device.

17. The method of claim 1, further comprising:
if said device is determined not to be in compliance with said anti-virus policy, preventing access to said protected resources.
18. The method of claim 1, further comprising:
redirecting a device that is not in compliance with said anti-virus policy to a sandbox server.
19. The method of claim 18, further comprising:
displaying a message to any device that is not in compliance with said anti-virus policy.
20. The method of claim 1, further comprising:
providing for said anti-virus policy to be updated periodically.
21. The method of claim 20, wherein said updated policy is automatically applied to a device.
22. The method of claim 1, further comprising:
receiving an anti-virus policy requiring use of a particular virus definition file; and
automatically requiring use of said particular virus definition file in order to access said protected resources.
23. A computer-readable medium having computer-executable instructions for performing the method of claim 1.
24. A downloadable set of computer-executable instructions for performing the method of claim 1.
25. A system for determining whether a computer system is in compliance with anti-virus rules required for access to protected data, the system comprising:
a client module on a computer system that receives a request for access to protected data, invokes a supervisor module, and provides information about said request for access to said supervisor module;
an interface module that obtains information regarding a virus protection module on said computer system; and
a supervisor module that, when invoked by said client module, requests information about said virus protection module in use on said computer system from said interface module, and determines whether to allow said computer system to access said protected data based upon whether said computer system is in compliance with anti-virus rules required for access to said protected data.
26. The system of claim 25, wherein said client module detects requests from said computer system for access to protected data.
27. The system of claim 25, wherein said anti-virus policy includes a particular virus protection module that is required to be in operation on said computer system.
28. The system of claim 25, wherein said anti-virus policy includes a particular virus definition file that is required to be in operation on said computer system.
29. The system of claim 25, wherein said anti-virus policy includes a particular anti-virus engine that is required to be in operation on said computer system.
30. The system of claim 25, wherein said supervisor module determines whether said computer system is in compliance with said anti-virus policy based upon information about said virus protection module on said computer system.
31. The system of claim 25, wherein said virus protection module includes a virus protection engine and at least one virus definition file.
32. The system of claim 25, wherein said interface module operates in conjunction with virus protection modules from a plurality of vendors.
33. The system of claim 25, wherein said interface module obtains information about at least one virus definition file on said computer system.
34. The system of claim 33, wherein said information about said virus definition file includes a selected one of publication date and version number.
35. The system of claim 25, wherein said interface module obtains information about a virus protection engine on said computer system.
36. The system of claim 35, wherein said information about said virus protection engine includes a selected one of publication date and version number.
37. The system of claim 25, wherein said supervisor module determines whether said computer system is in compliance with said anti-virus policy by comparing information about said virus protection module on said computer system with information about a virus protection module on at least one other device.
38. The system of claim 25, wherein said supervisor module determines whether said computer system is in compliance with said anti-virus policy based upon version information about said virus protection module.
39. The system of claim 25, wherein said supervisor module determines whether said computer system is in compliance with said anti-virus policy based upon publication date information about said virus protection module.
40. The system of claim 25, wherein said supervisor module prevents access to said protected data if said computer system is determined not to be in compliance with said anti-virus policy.
41. The system of claim 25, further comprising:
a sandbox server for providing information to computer systems not in compliance with said anti-virus policy.
42. A method for enforcing compliance with an anti-virus policy required for a device to obtain access to a network, the method comprising:
detecting a request from a device for access to a network;
determining an anti-virus policy applicable to the device;
collecting information about virus protection available on the device;
determining whether the device is in compliance with the anti-virus policy based upon the collected information; and
based upon said determination, applying an access policy to the device, said access policy for governing access by the device to the network.
43. The method of claim 42, wherein said determining step includes the substeps of:
determining the device requesting access to the network; and
retrieving an anti-virus policy applicable to that device.
44. The method of claim 42, wherein said collecting step includes retrieving the information using an interface to a virus protection application available on the device.
45. The method of claim 42, wherein said collecting step includes retrieving information about a virus definition file of said virus protection application.
46. The method of claim 42, wherein said collecting step includes retrieving information about a virus protection engine of said virus protection application.
47. The method of claim 42, wherein said determining step includes comparing the collected information to requirements of the anti-virus policy.
48. The method of claim 42, wherein said determining step includes comparing the collected information with information about an virus protection application on at least one other device.
49. The method of claim 42, wherein said determining step includes the substeps of:

retrieving virus protection information from at least one other device; and comparing the collected information about the device to the information retrieved from said at least one other device.

50. The method of claim 42, further comprising:

displaying a message to a device that is not in compliance with said anti-virus policy.

51. The method of claim 42, further comprising:

providing for said anti-virus policy to be updated periodically.

52. The method of claim 51, wherein said updated anti-virus policy is automatically applied to a device.

53. The method of claim 51, further comprising:

receiving an updated anti-virus policy requiring a particular virus definition file; and denying access to the network until said particular virus definition file is available on a device.

54. A method for requiring a plurality of devices connected to a network to apply a particular virus protection update, the method comprising:

receiving a request requiring devices connected to a network to apply a particular virus protection update;

determining whether each device connected to the network has applied the required virus protection update;

if a given device has applied the required update, permitting that device to continue to access the network; and if a given device has not applied the required update, terminating access to the network by that device.

55. The method of claim 54, wherein said request is a virus alert issued by a user.

56. The method of claim 54, wherein said particular virus protection update is a virus definition file update.

57. The method of claim 56, wherein a particular virus definition file version number is required.

58. The method of claim 56, wherein a virus definition file published more recently than a given time is required.

59. The method of claim 54, wherein said particular virus protection update is a virus protection engine update.

60. The method of claim 59, wherein a particular virus engine version number is required.

61. The method of claim 59, wherein a virus engine update published more recently than a given time is required.

62. The method of claim 54, wherein said determining step includes collecting virus protection information from each device.

63. The method of claim 54, wherein said determining step includes the substeps of:

collecting virus protection information from each device; and comparing the collected information to the virus protection update requirement.

64. The method of claim 54, wherein said step of terminating access to the network includes redirecting the device to a sandbox server for installation of the required virus protection update.

65. The method of claim 54, further comprising:

issuing a notification to a device that has not applied the required update.

* * * * *